No. 690,364. Patented Dec. 31, 1901.
J. J. GAFFNEY.
ELECTRIC SWITCH.
(Application filed Mar. 2, 1901.)

(No Model.) 2 Sheets—Sheet 1.

WITNESSES:
Geo. L. Richards
Joe Salmon

INVENTOR:
JOHN J. GAFFNEY
BY Fred C. Fraentzel,
ATTORNEY

THE NORRIS PETERS CO., PHOTO-LITHO., WASHINGTON, D. C.

No. 690,364. Patented Dec. 31, 1901.
J. J. GAFFNEY.
ELECTRIC SWITCH.
(Application filed Mar. 2, 1901.)
(No Model.) 2 Sheets—Sheet 2.

WITNESSES:
Geo. D. Richards
Joe Salmon.

INVENTOR:
JOHN J. GAFFNEY
BY Fred C. Fraentzel,
ATTORNEY

UNITED STATES PATENT OFFICE.

JOHN J. GAFFNEY, OF NEWARK, NEW JERSEY.

ELECTRIC SWITCH.

SPECIFICATION forming part of Letters Patent No. 690,364, dated December 31, 1901.

Application filed March 2, 1901. Serial No. 49,535. (No model.)

*To all whom it may concern:*

Be it known that I, JOHN J. GAFFNEY, a citizen of the United States, residing at Newark, in the county of Essex and State of New Jersey, have invented certain new and useful Improvements in Electric Switches; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention has reference to a novel construction of electric switch which is to be arranged in the main line, through which the electric current of high voltages from the main source of electricity passes, and which is to be employed for connecting a secondary circuit, such as a lamp-circuit, with the said main line or circuit.

The primary object of this invention is to provide a novel construction of electric switch for cutting in or cutting out from the main-line circuit a secondary or lamp circuit and completing or closing the main line before the secondary or lamp circuit, which is connected with the main line, is entirely cut out, (but being constructed to positively cut out the secondary line or lamp-circuit,) thereby preventing "arcing" or "sparking" and consequent accidents either to the linemen making the necessary electrical connections or repairs and also to the electric devices in the secondary line or lamp-circuit.

With the above-stated object in view my invention consists in the novel construction of electric switch hereinafter fully set forth; and, furthermore, the invention consists in the novel arrangements and combinations of the various parts, all of which will be more fully described in the following specification and then finally embodied in the clauses of the claim, which form a part of this specification.

The invention is clearly illustrated in the accompanying drawings, in which—

Figures 1, 2, 3:
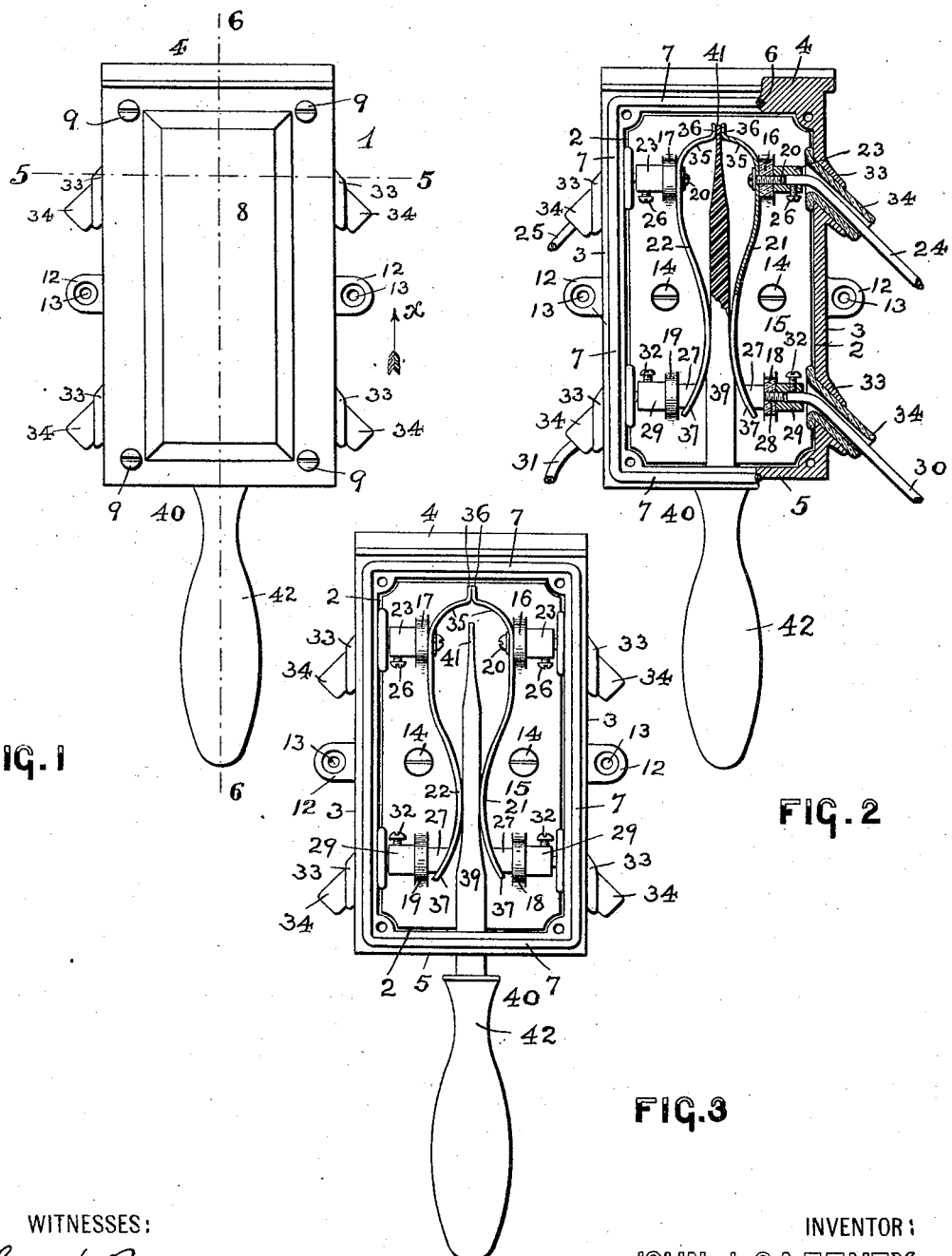
Figure 4:
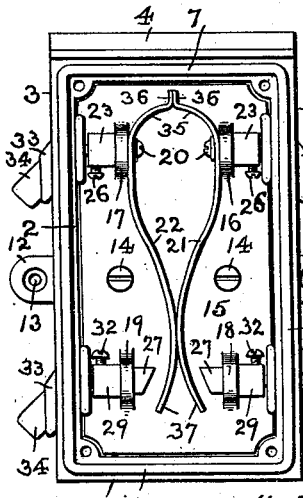
Figure 5:
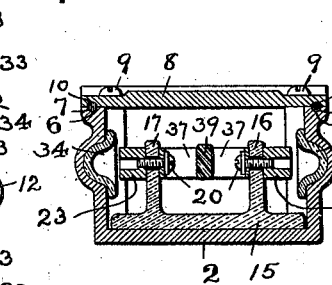
Figure 6:
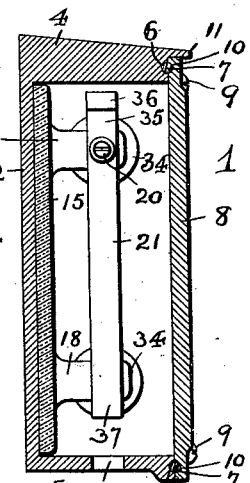
Figure 7:
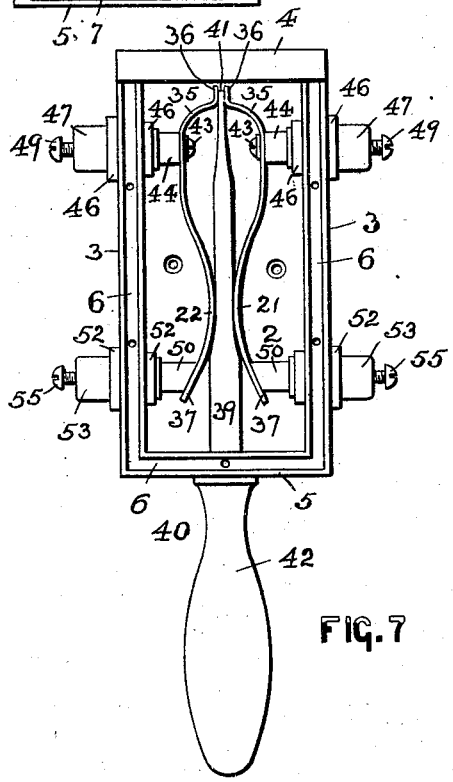
Figure 8:
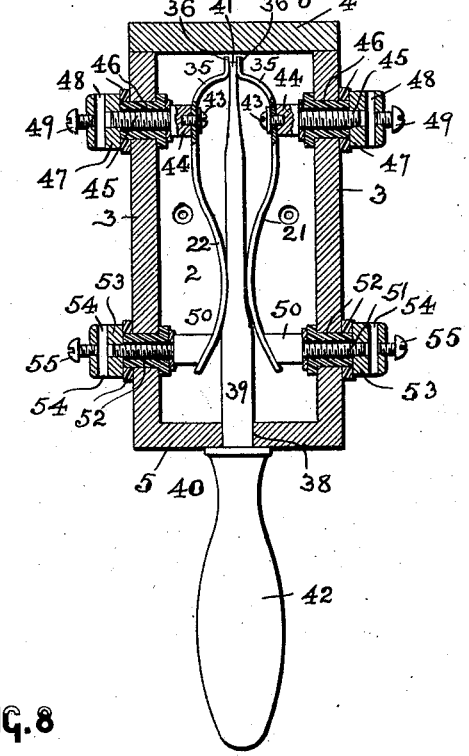

Figure 1 is a face view of a casing inclosing the electric switch, which is made according to the principles of this invention. Fig. 2 is a face view of the electric switch, the cover of the casing being removed and a portion of the casing being represented in horizontal section, the switch in this view being shown in that position when the secondary or lamp circuit is positively connected with the main line. Fig. 3 is a face view of said electric switch and its casing with the cover of the casing removed, the switch being represented in that position when the main line is short-circuited and the secondary line or lamp-circuit is still connected with said main line. Fig. 4 is a similar view of the said switch and its casing, the switch being illustrated in that position when the secondary line or lamp-circuit is positively cut out of circuit with the main line. Fig. 5 is a horizontal section taken on line 5 5 in Fig. 1 when looking in the direction of the arrow *x* in said figure, and Fig. 6 is a vertical section taken on line 6 6 in the same figure. Fig. 7 is a face view of an electric switch embodying the various features of this invention, this switch being intended for indoor work; and Fig. 8 is a horizontal section of the several parts represented in said Fig. 7.

Similar numerals of reference are employed in all of the said above-described views to indicate corresponding parts.

In the said drawings, 1 indicates a suitable casing, which can be made of iron, wood, or any other suitable material and comprises a back or base 2, the sides 3, the top 4, and the bottom or end 5, substantially as illustrated in the several figures of the drawings. In the construction of casing represented in Figs. 1 to 6, inclusive, I have arranged in the various edges of the sides, top, and bottom a suitable groove or depression 6 for the reception of a gasket or rubber packing 7. The cover of the casing is indicated by the reference-numeral 8, the said cover being secured to the said casing in any suitable manner, preferably by means of screws 9. The said cover 8 is also provided in the back with a groove or depression 10 (see Fig. 6) for fitting the said cover over the gasket or rubber packing 7, as shown, and thereby overcoming the possibility of rain or water getting into the casing and the parts of the switch, as will be clearly understood. The upper edge or roof of the casing may be made to incline toward the front of the casing, as illustrated in Fig.

6, being provided with a ledge 11, which extends beyond the face of the cover, as shown. The said casing is also provided with suitably-arranged lugs 12, which are provided with screw-holes 13 for securing the device in position upon a pole or against a building. Within said casing 1 I have secured against the back 2 thereof, by means of screws 14 or in any other desirable manner, the porcelain or glass base 15 of the switch. This base may also be made of any other suitable material which is a non-conductor of electricity. The said base 15 is provided with an arrangement of four posts 16, 17, 18, and 19, which preferably form an integral part of the base. Secured respectively against the inner surfaces of said posts 16 and 17, by means of the screws 20, are a pair of contact-making springs 21 and 22. Each screw 20 also secures a metal block 23 against the opposite sides of the said posts 16 and 17, and each block 23 is constructed to receive the ends of the main-circuit or main-line wires 24 25, which are held in position in said blocks 23 by the set-screws 26, and are thereby electrically connected with the respective spring-contacts 21 and 22. Suitably secured against the inner faces of the posts 18 and 19 are contact-blocks 27, of metal, said blocks 27 having screw portions 28, by means of which they can be secured in position on the one side of the respective posts 18 and 19, said screw portions 28 being made to extend through said posts and screwed into the metal blocks 29. These blocks 29 are thereby secured against the opposite sides of the posts 18 and 19, and each block 29 is constructed to receive the ends of the secondary or lamp circuit wires 30 31, which are securely held in position in said blocks 29 by means of set-screws 32. It will thus be evident that the lower ends of the spring-contacts 21 and 22 can be electrically connected by means of the blocks 27 and 29 with the secondary or lamp circuit wires. As an extra precaution to prevent rain or water getting into the casing 1 at the sides where the several wires pass into the casing downwardly-extending tubular projections 33 may be formed on the sides of the casing, and in each tubular projection is arranged a suitably-constructed sleeve 34, of porcelain or other suitable insulating material, as will be clearly seen from an inspection of the several figures of the drawings. The two spring-contacts 21 and 22 are each provided at the top with an inwardly-extending curved member 35, each member 35 being provided at its free end with a contact portion or end 36, substantially as illustrated. The lower end members 37 of said spring-contacts are bent or curved substantially as shown, so as to enable them at the proper time to make perfect contact with correspondingly-formed surfaces of the contact-blocks 27. Slidably arranged in a hole 38 in the bottom 5 of the casing 1 is the shank 39 of a plug 40, which is provided with a flattened end piece 41, adapted to be arranged between the spring-contacts 21 and 22, as shown, to separate the contact ends 36 of the two members 35. The said plug 40 and the parts connected therewith are wholly made of insulating material, and hence being a non-conductor of electricity the electric current will pass from the main wire 24 into the spring-contact 21, thence into the metallic contact-block 27, into and through the wires 30 and 31 of the secondary line or lamp-circuit, into the contact-block 27, and into the spring-contact 22. The electric current then passes out from said spring-contact 22, by means of the contact-block and screw connected with the post 17, into the main-circuit wire 25, as will be readily understood from an inspection of Fig. 2. As illustrated in said Fig. 2, the shank 39 of the plug 40 forces the lower end portions or members 37 of the two spring-contacts 21 and 22, respectively, in positive contact with the posts 18 and 19 and establish electrical connections with the wires 30 and 31 of the secondary or lamp circuit. At the same time the flattened end 41, which has been forced between the contact portions or ends 36 of the two spring-contacts 21 and 22, acts as a separator, and at this point the main circuit becomes interrupted and a complete circuit is established through the said main line and the secondary line or lamp-circuit. When it is desired to positively cut out the said secondary or lamp circuit from the main line, this is accomplished by withdrawing, by means of the handle 42, the said flattened end 41 and the shank 39 of the plug 40 from between the several parts of the two spring-contacts 21 and 22. In this manner the flattened end 41 is first withdrawn from between the two contact portions or ends 36 of the spring-contacts 21 and 22, whereby the main line is again closed, as will be clearly seen from an inspection of Fig. 3, but the end members 37 of the respective spring-contacts 21 and 22 are still making electric contact with the blocks 27, with which the ends of the wires 30 and 31 of the secondary or lamp circuit are connected. Thus there will be no sudden "breaking in" or "cutting out" in the main line, the latter being closed by short-circuiting before the secondary line or lamp-circuit is entirely cut out, and by this means all objectionable sparking and consequent accidents are clearly overcome. By entirely withdrawing the shank 39 of the plug 40 from between the end members 37 of the two spring-contacts 21 and 22 the said members 37 are withdrawn from their electrical contact with the blocks 27 and the said members 37 will come together, as clearly indicated in Fig. 4 of the drawings, and the secondary line or lamp-circuit is positively cut out of circuit with the main line.

From the above description of this invention and from the illustrations of the switch in the accompanying drawings it will be clearly evident that the making and breaking of the electrical connections between the main line and the secondary line or the lamp-circuit is a gradual one and at no time is the flow of the electric current in the main circuit completely interrupted until the secondary line or lamp-circuit has been positively cut in into the main line, and hence since there is no sudden break in the main line there is no possibility of producing an arc or dangerous sparking, especially in the lines of high voltages.

In Figs. 7 and 8 I have represented the switch and the plug 40 in connection with a casing and electrical connections placed or secured directly in the sides of the casing. In this instance the casing or box may be made of wood, the switch being intended mainly for indoor purposes. As will be seen from an inspection of said figures, the two spring-contacts 21 and 22 are respectively attached at or near their upper ends by means of screws 43 to the metallic contacts 44, each contact 44 being provided with a screw stud or stem 45, which passes through the insulating-collars 46 in the sides 3 of the casing and has its end portion screwed into a metal block 47. These blocks 47 are each provided with a receiving portion 48 for the ends of the main-line wires and with the set-screws 49 for securely attaching the respective ends of the wires to said blocks. The end members 37 of the spring-contacts 21 and 22 in this construction make and break electrical connection or contact with the metallic blocks 50. Each block 50 is provided with a screw-stud 51, which passes through the insulating-collars 52 in the sides 3 of the casing, and the end of each stud 51 is screwed into a metal block 53. Each block 53 is also provided with a receiving portion 54 and set-screw 55 for securely attaching the ends of the secondary line or lamp-circuit to said blocks 53. In all other respects the construction and arrangement as well as the manner of operation of the spring-contacts 21 and 22 and the plug 40 for making and breaking electrical contacts are the same as hereinabove described in connection with the electrical switch represented in Figs. 1 to 6 of the drawings.

The many advantages of my novel form of switch will be evident from the above description of the same, the withdrawal of the plug 40 causing the making of electrical contact between the portions or ends 36 of the two spring-contacts 21 and 22, whereby the main line is closed while the secondary line or lamp-circuit is still in shunt with the main line, and thereby positively preventing a dangerous flow of current and consequent arcing or sparking at either points of contact between the contact-springs and the contact-blocks in the secondary line or between the end members 36 in the main line.

I am fully aware that changes may be made in the several arrangements and combinations of the parts without departing from the scope of this invention. Hence I do not limit my invention to the exact arrangements and combinations of the parts as herein described and illustrated in the drawings, nor do I confine myself to the exact details of the construction of any of the said parts.

Having thus described my invention, what I claim is—

1. An electric switch, comprising, a pair of contacts connected to a main-line circuit, portions of which normally contact to close said main-line circuit, secondary-line terminals with which other portions of said contacts are adapted to make electrical connection, and a wholly-insulated plug adapted when inserted to cause the contacts to make connection with the secondary-line terminals and then to separate those portions of the contacts which normally contact, substantially as and for the purposes set forth.

2. An electric switch, comprising, a pair of contacts connected to a main-line circuit, portions of which normally contact to close said main-line circuit, secondary-line terminals with which other portions of said contacts are adapted to make electrical connection, and a wholly-insulated plug consisting, essentially, of a handle, and a shank having a flattened end, said shank being adapted when inserted to cause the contacts to make connection with the secondary-line terminals, and the flattened end causing the separation of those portions of the contacts which normally contact, substantially as and for the purposes set forth.

3. An electric switch, comprising, a pair of spring-contacts connected to a main-line circuit, each spring-contact being provided with contact portions extending in opposite directions from the points of connection with the main-line circuit, the upwardly-extending contact portions normally contacting to close said main-line circuit, secondary-line terminals with which the downwardly-extending contact portions are adapted to make electrical connection, and a wholly-insulated plug adapted to be inserted between said downwardly-extending contact portions to cause said portions to make electrical connection with the secondary-line terminals, before the main-line circuit becomes broken, and then to separate the upwardly-extending contact portions which normally contact, substantially as and for the purposes set forth.

4. An electric switch, comprising, a pair of spring-contacts connected to a main-line circuit, each spring-contact being provided with contact portions extending in opposite directions from the points of connection with the main-line circuit, the upwardly-extending contact portions normally contacting to close said main-line circuit, secondary-line terminals with which the downwardly-extending contact portions are adapted to make electrical contact, and a wholly-insulated plug consisting, essentially, of a handle, and a shank having a flattened end, said shank being adapted to be inserted between said downwardly-extending contact portions to cause said portions to make connection with the secondary-line terminals, before the main-line circuit becomes broken, and said flattened end causing the separation of the upwardly-extending contact portions which normally contact, substantially as and for the purposes set forth.

5. In an electric switch, the combination, with a casing, a pair of contact-blocks and means for arranging said blocks in the main line, a second set of contact-blocks, and means for arranging said second set of blocks in a secondary line, spring-contacts secured to said blocks in the main line, the upwardly-extending portions of which contact to close said main-line circuit, contact members at or near the lower ends of said spring-contacts adapted to establish electrical connections with the blocks in the secondary line, and a wholly-insulated plug adapted when inserted to cause the lower contact members to make electrical contact with the blocks in the secondary line, and then to separate the upwardly-extending portions which normally contact, substantially as and for the purposes set forth.

6. In an electric switch, the combination, with a casing, a pair of contact-blocks and means for arranging said blocks in the main line, a second set of contact-blocks, and means for arranging said second set of blocks in a secondary line, spring-contacts secured to said blocks in the main line, the upwardly-extending portions of which contact to close said main-line circuit, contact members at or near the lower ends of said spring-contacts adapted to establish electrical connections with the blocks in the secondary line, a wholly-insulated plug adapted when inserted to cause the lower contact members to make electrical contact with the blocks in the secondary line, said plug, comprising, a handle arranged outside of said casing, a shank 39 and flattened end 41 adapted to be removably arranged between the upwardly-extending portions of said spring-contacts which normally contact, substantially as and for the purposes set forth.

7. In an electric switch, the combination, with a casing, of a pair of contact-blocks and means for arranging the said blocks in the main line, a second set of contact-blocks, and means for arranging said second set of blocks in a secondary line, spring-contacts 21 and 22 secured to said contact-blocks in the main line, contact members 37 at the lower ends of said contact-springs, adapted to establish electrical connection with the blocks in the secondary line, members 35 on said contact-springs provided with contact-making ends 36 arranged to normally make electric contact between said spring-contacts and thereby close the main line, whether or not said members 37 are in electrical contact with the blocks in the secondary line, and a wholly-insulated plug adapted to be inserted between said spring-contacts 21 and 22, adapted when inserted to cause the contact members 37 to make said electrical connection with the blocks in the secondary line and then to separate the contact-making ends 36 which normally contact, substantially as and for the purposes set forth.

8. In an electric switch, the combination, with a casing, of a pair of contact-blocks and means for arranging the said blocks in the main line, a second set of contact-blocks, and means for arranging said second set of blocks in a secondary line, spring-contacts 21 and 22 secured to said contact-blocks in the main line, contact members 37 at the lower ends of said contact-springs, adapted to establish electrical connection with the blocks in the secondary line, members 35 on said contact-springs provided with contact-making ends 36 arranged to normally make electric contact between said spring-contacts and thereby close the main line, whether or not said members are in electrical contact with the blocks in the secondary line, and means wholly made of insulating material and adapted to be arranged between said spring-contacts and constructed to separate the upper contact ends 36 of the spring-contacts and to cause the lower contact members 37 to make positive electrical connections with the blocks in said secondary line, substantially as and for the purposes set forth.

9. In an electric switch, the combination, with a casing, of a pair of contact-blocks and means for arranging said blocks in the main line, a second set of contact-blocks, and means for arranging said second set of blocks in a secondary line, spring-contacts 21 and 22 secured to said contact-blocks in the main line, contact members 37 at the lower ends of said contact-springs, adapted to establish electrical connection with the blocks in the secondary line, members 35 on said contact-springs provided with contact-making ends 36 arranged to normally make electric contact between said spring-contacts and thereby close the main line, whether or not said members 37 are in electrical contact with the blocks in the secondary line, and means arranged between the said spring-contacts and constructed to separate the upper contact ends 36 to open the main line, and to cause the lower contact members of said spring-contacts to make electrical connections with the contact-blocks in the secondary line, consisting, essentially, of a wholly-insulated shank 39 and flattened end 41 adapted to be removably arranged between the several parts of said spring-contacts, substantially as and for the purposes set forth.

In testimony that I claim the invention set forth above I have hereunto set my hand this 27th day of February, 1901.

JOHN J. GAFFNEY.

Witnesses:
FREDK. C. FRAENTZEL,
PAUL SPENCER.